UNITED STATES PATENT OFFICE.

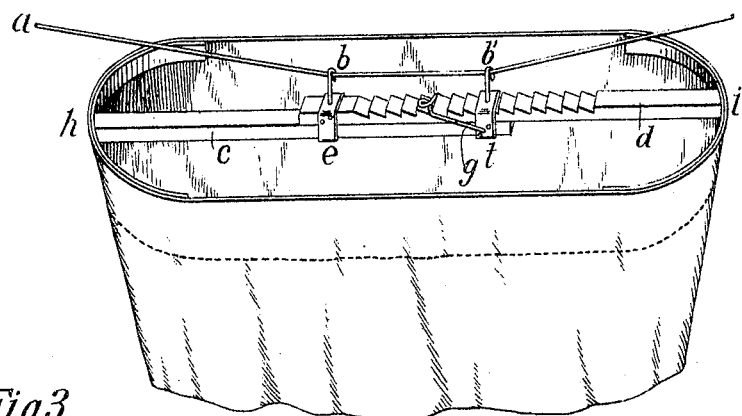
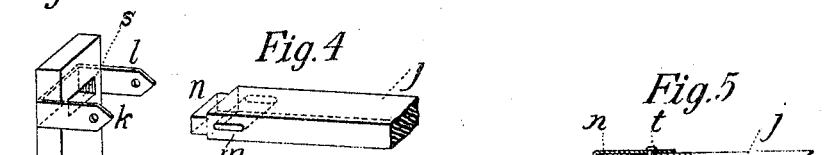
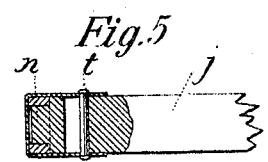
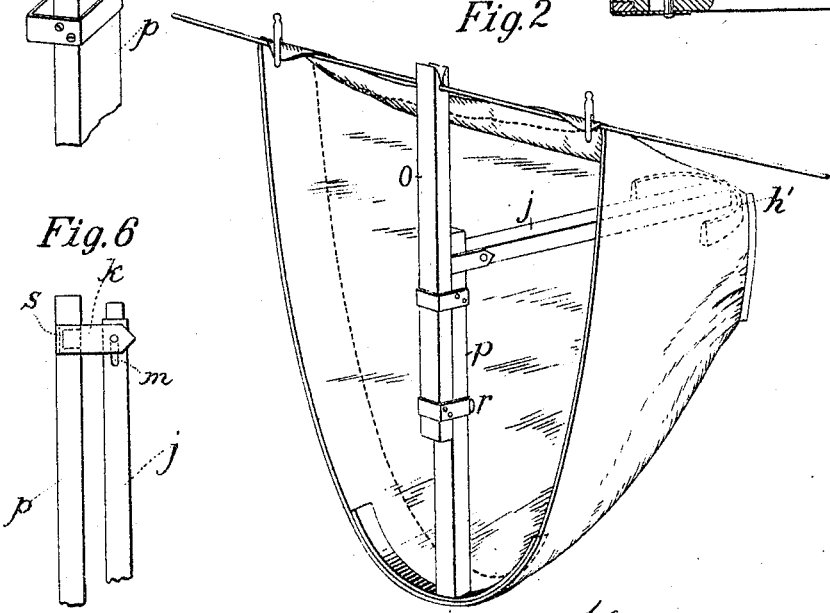
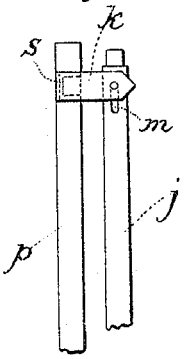

KATHERINE WALSH, OF MOORES MILL, NEW YORK.

DEVICE FOR DRYING, STRETCHING, AND AIRING ARTICLES OF APPAREL.

No. 798,547. Specification of Letters Patent. Patented Aug. 29, 1905.

Application filed November 27, 1903. Serial No. 182,731.

*To all whom it may concern:*

Be it known that I, KATHERINE WALSH, a citizen of the United States, residing at Moores Mill, Dutchess county, New York, have invented a new and useful Device for Drying, Stretching, and Airing Articles of Apparel, of which the following is a specification.

My invention consists of an improvement in devices for drying, stretching, and airing articles of apparel.

I have frequently observed that there was no apparatus in existence which permitted the drying of skirts which may have become wet in rainy weather and that there was no apparatus by which the skirt to be dried could be held in position so as to retain its original shape. The usual custom of drying skirts was to hang them flatly upon a line or other support, which prevented the free circulation of air and retarded the drying process.

My invention permits the skirt, while stretched to its proper shape, to be hung in the open air, permitting the free circulation of air to every part thereof, so that the drying process is more quickly accomplished and the skirt retains its proper and original shape.

This is the object of my invention, and I attain it by the means illustrated in the accompanying drawings, to which I refer, and in which—

Figure 1 shows an apparatus with the bottom of a skirt attached thereto and suspended from a line. Fig. 2 shows the apparatus attached to the bottom of the skirt, together with a projecting arm extending to the waistband of the skirt, permitting the skirt to be suspended from a line, as shown in said Fig. 2, and permitting a freer circulation of air and a more rapid drying process. Figs. 3, 4, 5, and 6 illustrate details of construction.

Similar letters of reference indicate similar parts throughout the several views.

Referring more specifically to Fig. 1, $b$ $b'$ represent hooks by means of which the device may be suspended from a line $a$ or other means of support. $c$ and $d$ represent bars adapted to slide with relation to each other, by means of which the skirt is held in shape. These bars, as shown in the drawings, overlap each other and are held in alinement by slides $e$ and $f$, one slide, as $e$, being attached to the bar $d$ and the other slide, as $f$, being attached to the bar $c$. The bar $d$ is preferably provided with teeth upon its upper surface, as shown in the drawings, into which the catch $g$ is adapted to fit in order to hold the bars in the extended position desired. The providing the bar $d$ with teeth is a preferable construction; but it is obvious that the same may be left plain, as in Fig. 2, and provided with a thumb-screw $r$ in place of the catch $g$, the screw passing through both of the bars, so as to hold the same firmly. Each bar is provided with a semicircular band $h$ and $i$, respectively, at its end, said band being adapted to fit along the base of the skirt, as shown in Fig. 1. It is obvious that as the bars $c$ and $d$ are moved with relation to each other, so as to increase the distance between their ends, the bands $h$ and $i$, fitting into the base of the skirt, will stretch the latter and hold it in extended form.

The device may be provided with an extension piece or arm $j$, as shown in Fig. 2, adapted to support the waistband of the skirt. One of the bars, as $p$ in Fig. 2, (shown in detail in Fig. 3,) may be recessed, as shown at $s$, to receive the tenon $n$ of the bar $j$. The bar $p$ is provided with a bracket having arms $k$ and $l$ at either side of the recess $s$, the brackets being provided with holes to receive a pin $t$, adapted to pass through the oblong opening $m$ in the bar $j$. The arrangement of parts is such that when the bar $j$ is supported in the arms $k$ and $l$ of the bracket on the bar $p$ it may be slid toward and away from the bar $p$ on the pin $t$, so that the tenon $n$ may fit into the recess $s$ and hold the parts firmly together or may be removed therefrom, permitting the bars $p$ and $j$ to be collapsed upon each other, as shown in Fig. 6. The bars $j$ and $p$ may be provided at their outer extremities with semicircular bands $h'$ and $i'$ for holding the skirt in proper position. It is obvious that when the arm $j$ is knocked down or collapsed with reference to the arm $p$ it will form practically an extension of the said arm $p$ and be the equivalent of the device illustrated in Fig. 1, thus providing in one structure not only means for stretching and drying the bottom of a skirt, but means for also stretching the bottom and skirt-band of a skirt.

By the device described I obtain means for the rapid drying of skirts and a retention of their original shape, at the same time reshaping skirts which have lost their shape by means of being wet, &c.

What I claim as my invention, and desire to secure by Letters Patent, is—

1. A device of the character described comprising two bars having means whereby they are adapted to longitudinal movement upon each other, means for holding them in fixed position with relation to each other, an arm provided with means by which it may be held at right angles to or collapsed upon one of said bars, and a bracket on said bar provided with means adapted to support said arm, substantially as described.

2. A device of the character described comprising two bars having means whereby they are adapted to longitudinal movement upon each other, means for holding them in fixed position with relation to each other, one of said bars being provided with a recess, a bracket supported by said bar, and a slotted arm adapted to be supported in said bracket provided with a tenon adapted to fit into said recess whereby said arm may be held at right angles to said bar or collapsed upon it, substantially as described.

In witness whereof I have hereunto signed my name in the presence of two witnesses.

KATHERINE WALSH.

Witnesses:
 KATHERINE A. WALSH,
 EMILY F. WALSH.